(12) United States Patent
Kwon et al.

(10) Patent No.: US 7,795,831 B2
(45) Date of Patent: Sep. 14, 2010

(54) WIPER CONTROL DEVICE

(75) Inventors: Mun-Soon Kwon, Gyeonggi-do (KR); Hwa-sik Shim, Gyeonggi-do (KR); Ju-ho Ahn, Gyeonggi-do (KR); Jae-hyun Kim, Gyeonggi-do (KR)

(73) Assignee: Hyundai Autonet Co., Ltd., Ichon-si (KR)

( * ) Notice: Subject to any disclaimer, the term of this patent is extended or adjusted under 35 U.S.C. 154(b) by 290 days.

(21) Appl. No.: 11/875,443

(22) Filed: Oct. 19, 2007

(65) Prior Publication Data

US 2008/0094016 A1    Apr. 24, 2008

(30) Foreign Application Priority Data

Oct. 23, 2006    (KR) ............... 10-2006-0103129

(51) Int. Cl.
*H02P 5/00*    (2006.01)
*H02P 7/00*    (2006.01)
*H02P 1/04*    (2006.01)

(52) U.S. Cl. .................. 318/443; 318/282; 318/466

(58) Field of Classification Search .......... 318/443, 318/282, 466
See application file for complete search history.

(56) References Cited

U.S. PATENT DOCUMENTS 6,072,295 A * 6/2000 Kusunoki ............... 318/444

FOREIGN PATENT DOCUMENTS

| KR | 1996 0006000 | 7/1996 |
| KR | 2002 0021526 | 3/2002 |
| KR | 10 2005 0121565 | 12/2005 |
| KR | 10 2006 0054770 | 5/2006 |

OTHER PUBLICATIONS

English language Abstract of KR 1996-0006000, Jul. 19, 1996.
English language Abstract of KR 2002-0021526, Mar. 21, 2002.
English language Abstract of KR 10-2006-0054770, May 23, 2006.
English language Abstract of KR 10-2005-0121565, Dec. 27, 2005.

* cited by examiner

*Primary Examiner*—Bentsu Ro
*Assistant Examiner*—Erick Glass
(74) *Attorney, Agent, or Firm*—NSIP Law

(57) ABSTRACT

Provided is a wiper control device. The device includes a first output IC, a direct driving switch, a second output IC, and an MCU. The first output IC supplies a power source for a wiper operation control in IG2 OFF state. The direct driving switch directly drives wipers. The second output IC intermits the power source to a wiper motor. The MCU controls the second output IC to drive the wipers depending on the direct driving switch.

8 Claims, 4 Drawing Sheets

WIPER CONTROL DEVICE

BACKGROUND OF THE INVENTION

1. Field of the Invention

The present invention relates to a wiper control device, and more particularly, to a wiper control device for controlling a function of a wiper device used for vehicles, providing a solution to a driver's or passenger's inconvenience.

2. Description of the Related Art

Motorcars have been put to practical use, following steam cars, at the end of the 19$^{th}$ century. Motorcars have been indispensable to men and goods transportation.

Drivers activate wipers installed in front of vehicles if it rains. Drivers manipulate a wiper lever, controlling an operation speed of wipers depending on the amount of rainfall.

FIG. 1 is a block diagram illustrating a conventional wiper control device.

The conventional wiper control device includes a wiper motor 1 for activating wipers; a Multi/Function (M/F) switch 2 for activating a relay 3 and controlling the wiper motor 1; a Micro Controller Unit (MCU) 4 for controlling the M/F switch 2 according to user's manipulation; a wiper sensor 5 for sensing wiper stop positions; a wiper switch 6 for rotating and manipulating the wipers; a wireless remote controller 7; a car key 8 for starting cars on or off; and a car door lock 9 for locking doors.

In the conventional wiper control device, wipers are activated when the wiper switch 6 is manipulated in an ignition 2 (IG2) ON state starting by the car key 8.

The MCU 4 determines whether wipers are in parking position if an IG2 OFF state starts while the wipers are activated. If the wipers are not in the parking position, the MCU 4 controls the M/F switch 2 to rotate and move the wipers to the parking position.

However, the conventional wiper control device cannot meet a variety of driver's demands because the device automatically moves wipers to a parking position upon starting of the IG2 OFF state. In other words, there is not a method for positioning wipers in any specific position on a windshield glass according to drivers' intention.

The conventional wiper control device does not provide a solution to a risky situation that wipers fail to operate because the wipers cannot operate in the presence of a failure of the MCU 4. In other words, it is very risky for the wipers to fail to operate during rainy driving due to a failure of the MCU 4.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a wiper control device configured to rotate and move wipers to any specific position in an IG2 OFF state according to drivers' intention.

Another aspect of exemplary embodiments of the present invention is to provide a wiper control device configured to execute the minimum wiper function even upon a failure of an MCU controlling an operation of wipers.

According to one aspect of exemplary embodiments of the present invention, there is provided a wiper control device for, when ignition 2 (IG2) OFF starts, automatically performing a regular-position stop control while wipers are activated. The device includes a first output IC, a direct driving switch, a second output IC, and a Micro Control Unit (MCU). The first output IC supplies a power source for a wiper operation control in IG2 OFF state. The direct driving switch directly drives wipers. The second output IC intermits the power source supplied from the first output IC to a wiper motor. The MCU controls the second output IC to drive the wipers depending on the direct driving switch.

The MCU may drive and control the second output IC depending on a signal inputted from the direct driving switch.

The MCU may drive and control the second output IC to rotate and move wipers at the lowest of a preset wiper operation speed.

The second output IC may intermit the power source supplied to the wiper motor depending on a wiper operation signal inputted from a Multi Function (M/F) switch controlling operation of wipers.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF THE INVENTION

Exemplary embodiments of the present invention will now be described in detail with reference to the annexed drawings. In the following description, a detailed description of known functions and configurations incorporated herein has been omitted for conciseness.

Figure 1:
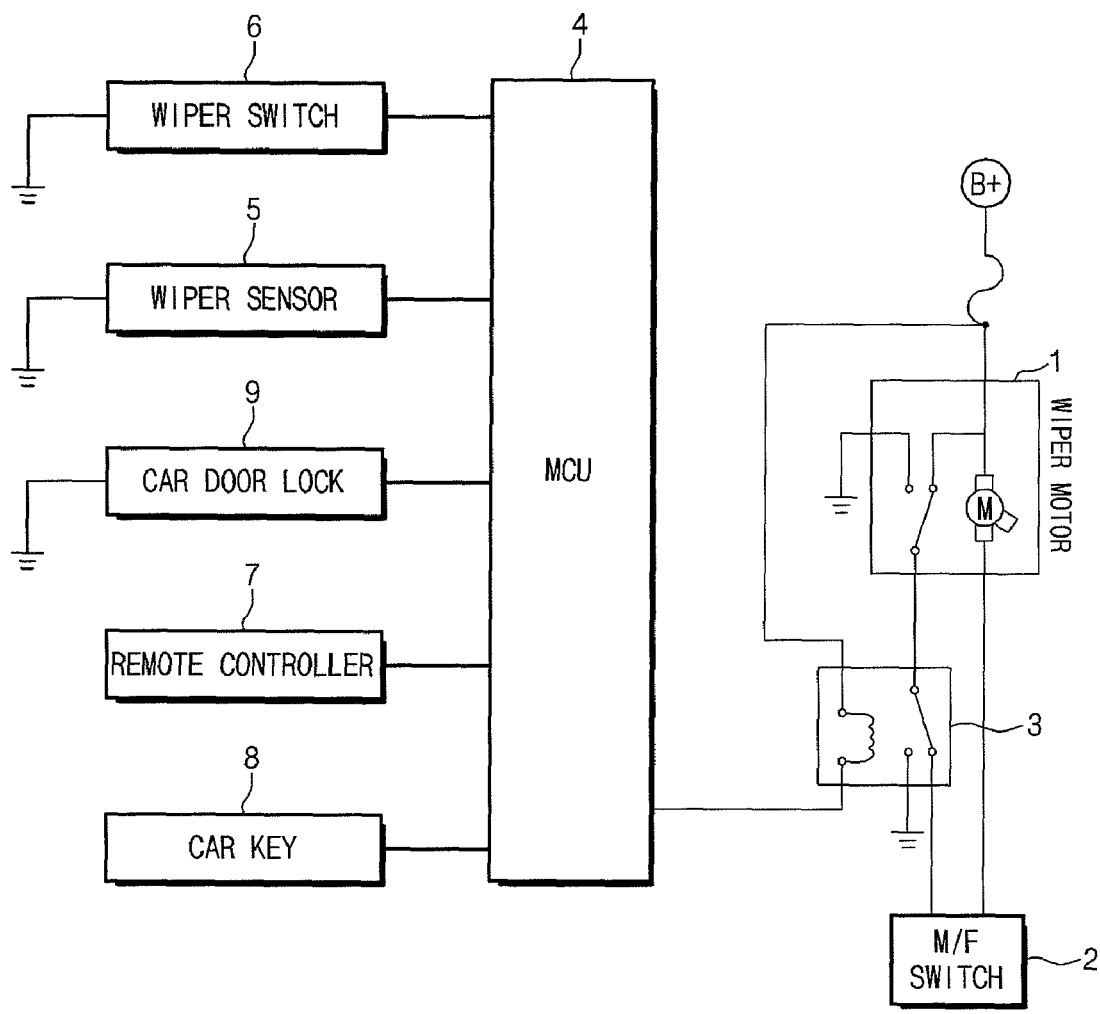
FIG. 1 is a block diagram illustrating a construction of a conventional wiper control device.
Figure 2:
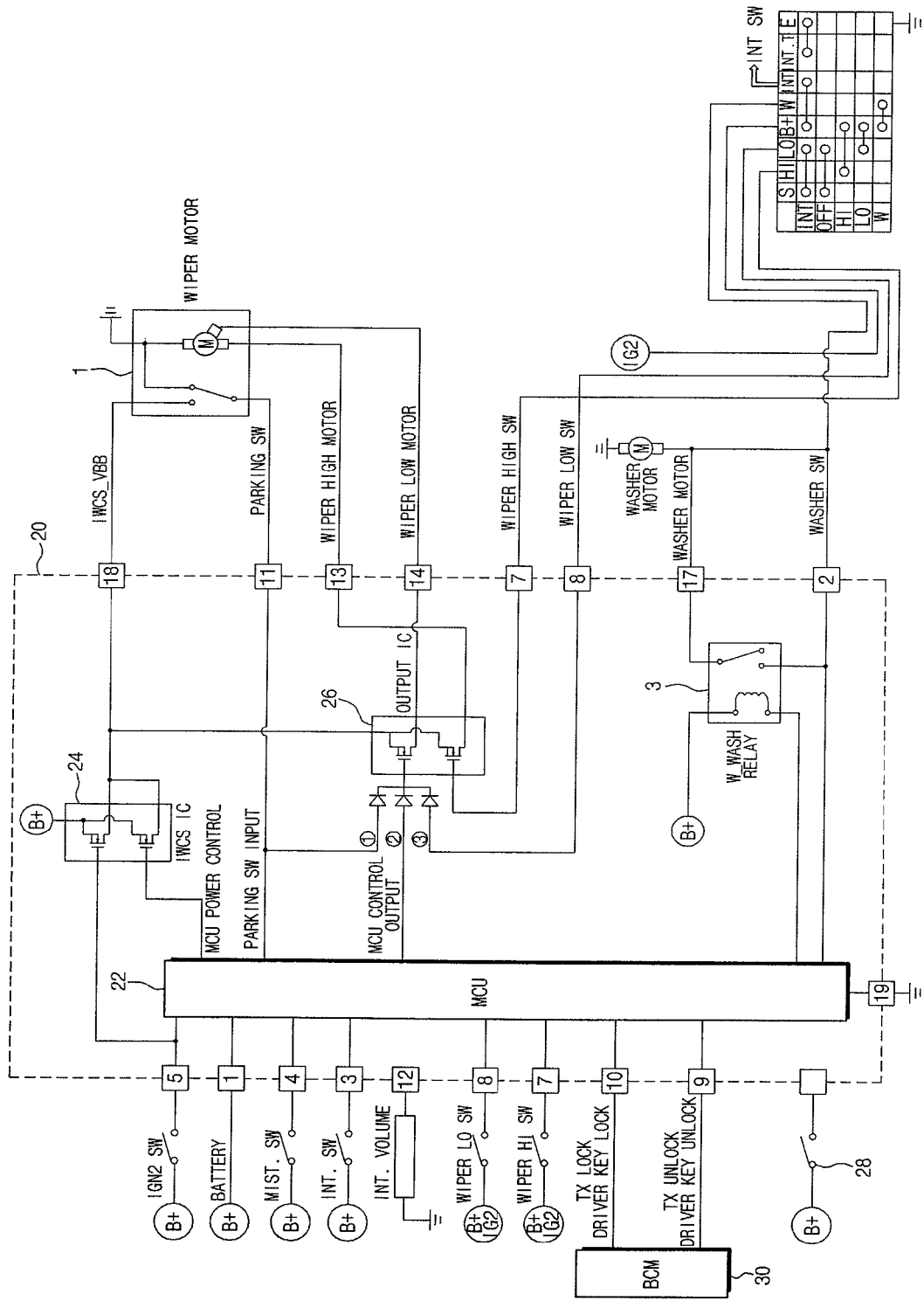
FIG. 2 is a block diagram illustrating a construction of a wiper control device according to the present invention.
Figure 3:
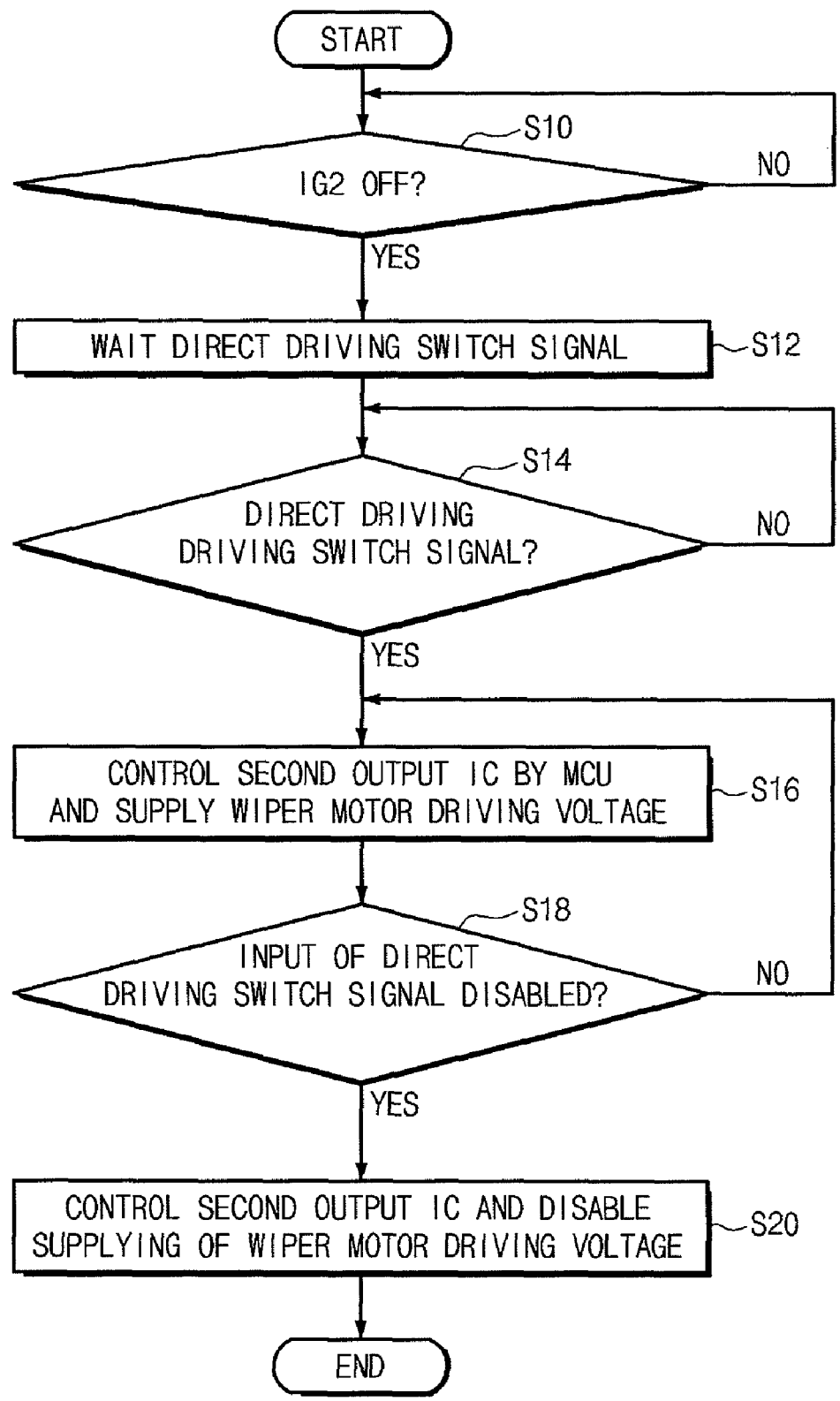
FIG. 3 is a flowchart illustrating an operation of a wiper control device responsive to a driver's request for direct driving according to the present invention.
Figure 4:
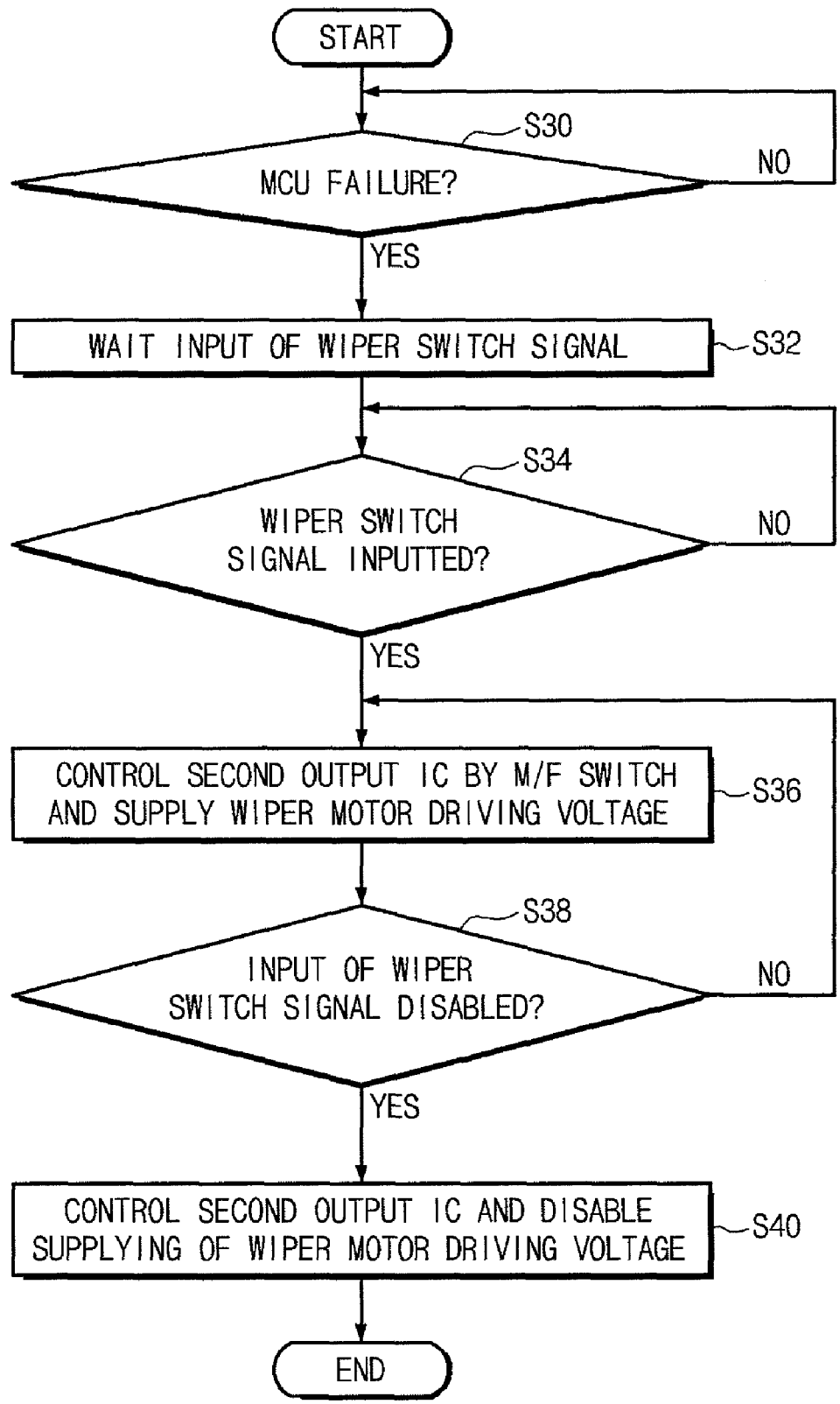
FIG. 4 is a flowchart illustrating an operation of a wiper control device in an MCU failure state according to the present invention.

FIG. 2 is a block diagram illustrating a construction of a wiper control device according to the present invention. FIG. 3 is a flowchart illustrating an operation of a wiper control device responsive to a driver's request for direct driving according to the present invention. FIG. 4 is a flowchart illustrating an operation of a wiper control device in an MCU failure state according to the present invention.

The wiper control device according to the present invention is applied to a wiper control device performing a regular-position stop control when IG2 OFF starts during wiper activation. There are Power sources supplied to the vehicle, for example, B+, accessory (ACC), ignition 1 (IG1), ignition 2 (IG2), and start (ST). Among them, IG2 power supply is supplied when ignition key (IGN KEY) is in its ON position.

The wiper regular-position stop control can be performed in such a manner that when IG2 OFF starts, an MCU 22 outputs a control signal to a second output Integrated Circuit (IC) 26 via line ①, supplying a power source to a wiper motor 1.

The present invention includes a first output IC 24 for supplying a power source for wiper operation control in IG2 OFF state; a direct driving switch 28 for directly driving wipers; the second output IC 26 for intermitting the power source supplied from the first output IC 24 to the wiper motor 1; and the MCU 22 for controlling the second output IC 26 to activate the wipers according to the direct driving switch 28.

The first output IC 24 supplies a battery power source to the MCU 22, the wiper motor 1, etc. when IG2 ON or OFF starts.

The direct driving switch 28 is installed at a driver's seat such that a driver can manipulate the direct driving switch 28. If the direct driving switch 28 is pressed, the MCU 22 controls the second output IC 26 to supply a power source to the wiper motor 1.

The MCU 22 performs a driving control for the second output IC 26 depending on an input signal from the direct driving switch 28. In other words, the MCU 22 controls the second output IC 26 and rotates and moves wipers to a predetermined position by a time for which the direct driving switch 28 is pressed.

The MCU 22 drives and controls the second output IC 26 such that wipers are rotated and moved at the lowest of a preset wiper operation speed.

Non-described reference numeral 30 of FIG. 2 denotes a Body Control Module (BCM) for receiving and processing a signal sent from a wireless control remote controller.

Operation flow responsive to the above-described driver's request for direct driving will be described with reference to FIG. 3.

In the present invention, the MCU 22 checks whether it is in IG2 OFF state (S10). If being in the IG2 OFF state, the MCU 22 waits until a direct driving switch signal from the direct driving switch 28 is inputted (S12) and determines whether the direct driving switch signal is inputted (S14).

When determining that the direct driving switch signal is inputted (S14), the MCU 22 controls the second output IC 26 through a diode having connection with line ② (S16), supplying a battery power source to the wiper motor 1 through the second output IC 26 to rotate and move wipers.

Next, the MCU 22 determines whether input of a direct driving switch signal is disabled (S18). The MCU 22 controls the second output IC 26 to cut off a power source supplied to the wiper motor 1 (S20) if the input of the direct driving switch signal is disabled.

In other words, while the direct driving switch 28 is pressed, the MCU 22 drives and controls the second output IC 26, controlling activation of the wiper motor 1.

Operation flow of an MCU failure state in the wiper control device according to the present invention will be described with reference to FIG. 4.

Operation of driving wipers in an MCU fail state (S30) is performed irrespective of IG2 ON or OFF state.

In the MCU failure state, the M/F switch 2 waits until a wiper switch signal from a wiper switch 6 is inputted (S32) and determines whether a wiper switch signal is inputted (S34). Here, it is desirable that the wiper switch 6 is distinguished into a wiper high switch and a wiper low switch.

If the determination result is that a wiper low switch signal is inputted (S34), the M/F switch 2 controls the second output IC 26 to supply a power source to the wiper motor 1 through a diode having connection with line ③ and if a wiper high switch signal is inputted, the M/F switch 2 controls the second output IC 26 to directly supply a power source to the wiper motor 1 (S36).

Thus, the battery power source is supplied to the wiper motor 1 through the second output IC 26, thereby rotating and moving wipers.

Next, the M/F switch 2 determines whether input of the wiper switch signal is disabled (S38). The M/F switch 2 controls the second output IC 26 to cut off a power source supplied to the wiper motor 1 (S40) if the input of the wiper switch signal is disabled.

In other words, even upon a failure of the MCU 22, wiper high or low rotation can be performed if a wiper switch signal is inputted through the M/F switch 2.

Wiper operation can be controlled on the basis of a remote control signal received through the BCM 30.

As described above, the present invention can rotate and move wipers to any specific position according to drivers' intention in IG2 OFF state.

Also, the present invention can execute the minimum wiper function even upon a failure of an MCU controlling an operation of wipers.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wiper control device for, when ignition2 (IG2) OFF starts, automatically performing a regular-position stop control while wipers are activated, the device comprising:
   a first output IC for supplying a power source for a wiper operation control in the IG2 OFF state;
   a direct driving switch for directly driving the wipers;
   a second output IC for intermitting the power source supplied from the first output IC to a wiper motor; and
   a Micro Control Unit (MCU) for controlling the second output IC to drive the wipers to a particular position depending on a length of time a user depresses the direct driving switch.

2. The device of claim 1, wherein the MCU drives and controls the second output IC depending on a signal inputted from the direct driving switch.

3. The device of claim 2, wherein the MCU drives and controls the second output IC to rotate and move wipers at the lowest of a preset wiper operation speed.

4. The device of claim 1, wherein the second output IC intermits the power source supplied to the wiper motor depending on a wiper operation signal inputted from a Multi Function (M/F) switch controlling operation of wipers.

5. A wiper control device for, when ignition2 (IG2) OFF starts, automatically performing a regular-position stop control while wipers are activated, the device comprising:
   a first output integrated circuit (IC) to supply a power source to control an operation of the wipers in the IG2 OFF state;
   a direct driving switch to allow a user to control a position of the wipers; and
   a Micro Control Unit (MCU) to control a signal output from the direct driving switch to the wipers based on a length of time the user depresses the direct driving switch.

6. The wiper control device of claim 5, further comprising:
   a wiper motor to move the wipers upon the depression of the direct driving switch.

7. The wiper control device of claim 6, further comprising:
   a second output IC for intermitting the power source supplied from the first output IC to the wiper motor.

8. The wiper control device of claim 5, wherein the length of time the direct driving switch is depressed is directly proportional to the distance the wipers move during the depression of the direct driving switch.

* * * * *